United States Patent [19]

Inoue et al.

[11] Patent Number: 4,762,405
[45] Date of Patent: Aug. 9, 1988

[54] INVERTED-DESIGN MICROSCOPE

[75] Inventors: Yasuo Inoue; Itaru Endo, both of Hachiouji, Japan

[73] Assignee: Olympus Optical Co., Ltd., Tokyo, Japan

[21] Appl. No.: 42,519

[22] Filed: Apr. 27, 1987

Related U.S. Application Data

[63] Continuation of Ser. No. 717,091, Mar. 27, 1985, abandoned.

[30] Foreign Application Priority Data

Mar. 29, 1984 [JP] Japan ................... 59-061769

[51] Int. Cl.$^4$ .................. G02B 21/32; G02B 21/14
[52] U.S. Cl. ..................... 350/507; 350/510; 350/520
[58] Field of Search ............... 350/507, 509, 510, 518, 350/520, 521, 529, 530, 531, 237–244

[56] References Cited

U.S. PATENT DOCUMENTS 1,129,742  2/1915  Sheaff .......................... 350/507
4,270,838  6/1981  Furusawa et al. .

FOREIGN PATENT DOCUMENTS 4411235   5/1969  Japan .
57-53925  10/1982 Japan .
2022287   8/1982  United Kingdom .

OTHER PUBLICATIONS

Abstract for Micromanipulator, Kokai No. 54-158945, filed May 6, 1978, 142 E 171.

Primary Examiner—Jon W. Henry
Attorney, Agent, or Firm—Cushman, Darby & Cushman

[57] ABSTRACT

An inverted-design microscope provided with a micromanipulator so as to be movable along the optical axis in interlocking with the movement of the objective lens for focusing and pricing in order that the micromanipulator may be operated minutely and simply on an object to be observed without preventing the illuminating system from being attached, detached, replaced or switched. The micromanipulator is so formed as to be able to prick the object along the optical axis of the objective lens in such a manner that the tip part of a stylus of the micromanipulator is always arranged slightly above a focus position of the objective lens.

4 Claims, 3 Drawing Sheets

INVERTED-DESIGN MICROSCOPE

This is a continuation of application Ser. No. 717,091, filed Mar. 27, 1985, which was abandoned upon the filing hereof.

BACKGROUND OF THE INVENTION (a) Field of the Invention

This invention relates to microscopes and more particularly to an inverted-design microscope provided with a micromanipulator.

(b) Description of the Prior Art

There is already known such inverted-desitn microscope of this kind as is mentioned, for example, in Japanese patent publication No. 53925/1982. Therein, as shown in FIG. 1, a micromanipulator 2 is integrally incorporated in the condenser lens 1 of a microscope so that, when the micromanipulator 2 is vertically moved along the optical axis of the objective lens 3, its tip part will be thrust into a cell within a cultivating vessel 5 mounted on a stage 4. Recently, the object of such cell manipulation has come to be minute. Such manipulation as, for example, of discriminating the colors of a nucleus derived from an ovum wihtin a fertilized cell of a mouse and a nucleus derived from a spermatozoon and sucking only the nucleus derived from the ovum is carried out under the differential interference observation from the viewpoint of the resolving performance. In the case of setting the above mentioned micromanipulator 2 or manipulating egg cells of a cow, a comparatively low magnification is often used. Therefore, in the case of switching the magnification or switching to the differential interference observation system, it is necessary to attack, detach, replace or switch the illuminating system, that is, the condenser lens. However, in the above mentioned conventional structure, as the micromanipulator 2 is integrally attached to the condenser lens 1, the illuminating system, that is, the concenser lens 1 has not been able to be easily attached, detached, replaced or switched.

Also, there is known an inverted-design microscope provided with a micromanupulator of the formation shown in FIG. 2. In FIG. 2, the reference numeral 10 represents a stage of the microscope, 11 represents a cultivating vessel mounted on the stage 10 and containing cells 11a, 12 represents a condenser lens including a ring slit 12a wihtin, 13 represents an objective lens attached to a revolver 14 and having a phase plate 15 within and 16 represents a micromanipulator fixed to the stage 10 (or to a part of the microscope body near the stage 10) through a attaching tool 17 and having its glass stylus 16a extended to the cell 11a within the caltivating vessel 11, that is, to the vicinity of the focus position of the microscope. In the thus formed inverted-design microscope, in the case of carrying out a so-called pricking technique, for example, of thrusting the glass stylus 16a of the micromanipulator 16, by an operating handle 16c, into the cell 11a within the caltivating vessel 11 to impregnate the cell with enzyme in the caltivating liquid, firstly, the glass stylus 16a is positioned near the upper surface of the cell by using manipulation handles 16c, 16d, 16e under the close observation by the eye and/or the objective lens and is thrust into cell 11a by the manipulation handle 16e. Next, the glass stylus is carefully raised far enough not to break it by the manipulation handle 16c, and the caltivating vessel 11 is moved to enable to thrust the glass stylus 16a into the next cell in the caltivating vessel 11. This is usually done by operator's fingers. If, however, this is done by a sample stage handle of the microscope, the operation is much complicated because the above mentioned first step must be repeated. Therefore, in the prior art even a skilled person will be limited to treat, for example, about 500 cells per hour and, as the bottom surface of the caltivating vessel or particularly of a plastic vessel is not flat and the growth of the cells does not expand uniformly along the bottom surface of the caltivating vessel, the positions in the optical axis direction of the respective cells will be different, thus the focus will deviate in moving the stage 10 in the horizontal direction, therefore it will be necessary to make a two-step operaion, that is, to make focusing with a focusing handle and then to operate the respective operating parts of the micromanipulator 16 so as to bring its glass stylus 16a to the vicinity of the focus position and therefore the manipulation will be very complicated.

SUMMARY OF THE INVENTION

In view of the above description, a primary object of the present invention is to provide an inverted-design microscope provided with a micromanipulator wherein various minute manipulations can be made on an object to be observed.

According to the present invention, this object is attained by a formation wherein a micromanipulor is so arranged as to move vertically in interlocking with the movement of an objective lens with a focusing handle of the microscope for focusing and pricking in the optical axis direction of the objective lens.

According to a preferred formation of the present invention, the micromanipulator is made movable at least in the vertical direction with respect to the objective lens aside from the interlocking with the objective lens by a handle.

According to the present invention, as the micromanipulator is not incorporated in the condenser lens, the illuminating system or particularly the condenser lens can be easily replaced or switched to accompany switching to a phase contrast microscopy or to a differential interference microscopy which is important, for example, to the genic operation. Once the tip part of the glass stylus of the micromanipulator is set slightly above the focus position, that is, still within the focal depth, the tip part of the glass stylus will be always in the visual field of an eyepiece during a pricking operation therefore a minute manipulation will be able to be made very efficiently, for example, about 1000 to 2000 cells will be able to be treated per hour in pricking. For example, even in case the bottom part of the caltivating vessel is not flat, if focusing is performed in accordance therewith, the stylus is inevitably moved in a proper position for the pricking operation and is continuously moved by the same focusing handle to prick the cell brought into the proper position and therefore it is not necessary to perform a two-step operation of focusing followed by stylus setting. Accordingly, the manipulation is performed efficiently, even if the bottom part of the caltivating vessel is not flat.

DESCRIPTION OF THE PREFERRED EMBODIMENTS

Figure 1:
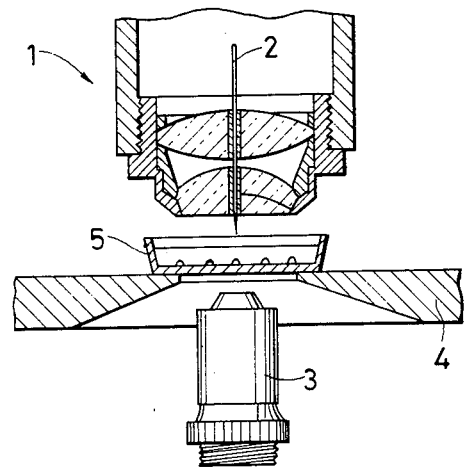
FIGS. 1 and 2 are views each showing a conventional inverted-design microscope provided with a micromanipulator.
Figure 2:
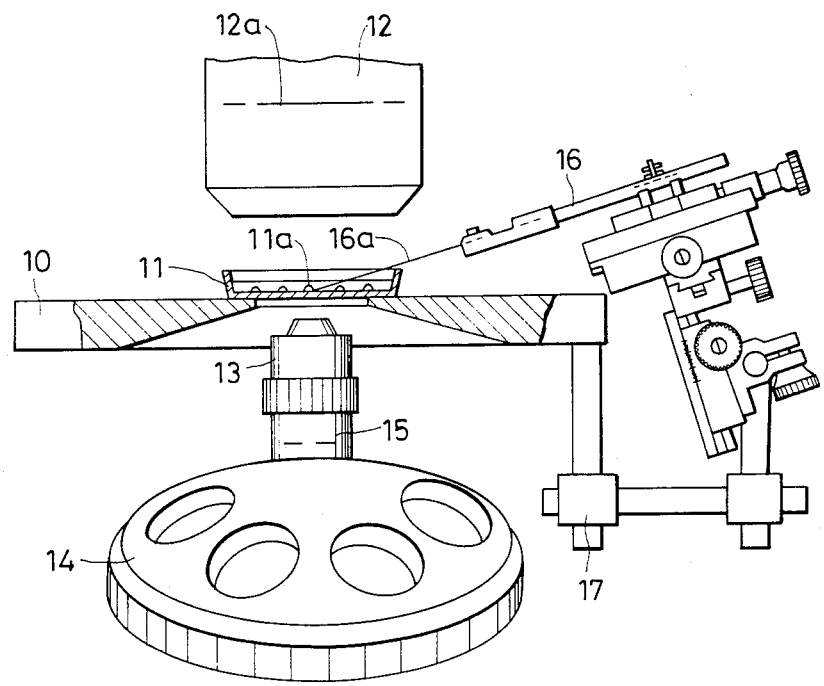
Figure 3:
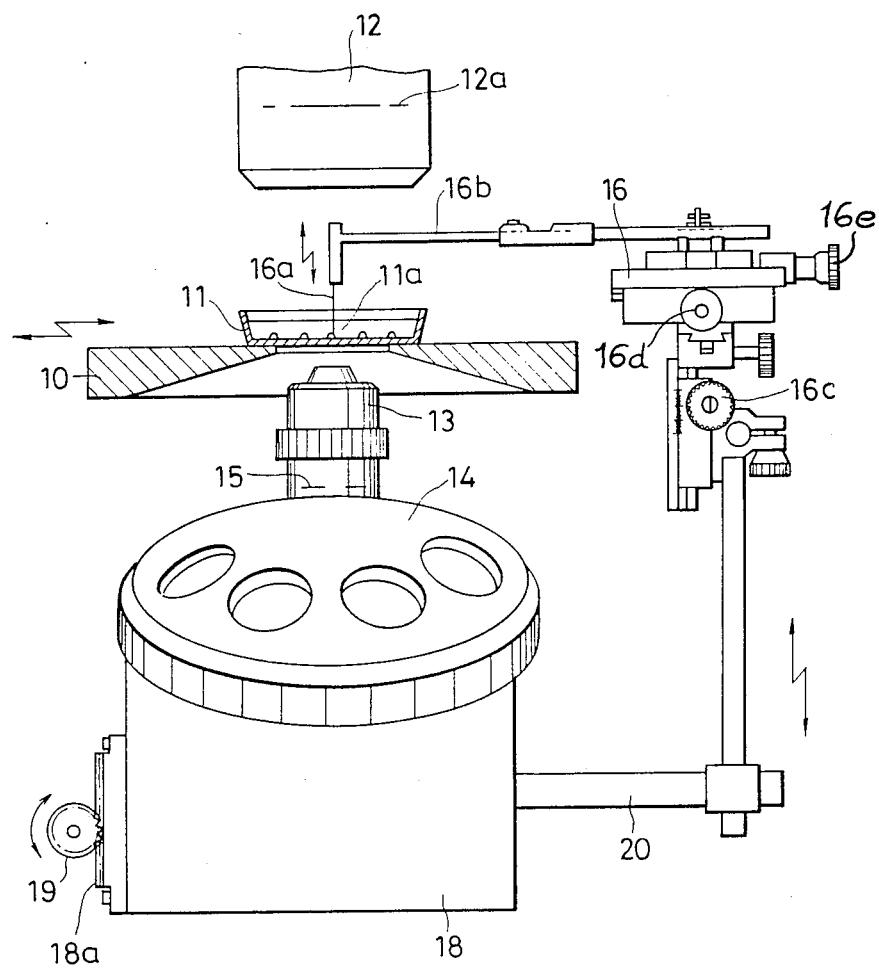
FIG. 3 is a view showing an embodiment of the inverted-design microscope according to the present invention.

The present invention shall be explained in the following with the embodiment shown in FIG. 3. The same reference numerals shall be attached to the same respective components as of the conventional example in FIG. 2 and shall not be explained. The reference numeral 18 represents a revolver holding base pivotally supporting a revolver 14 and made to move vertically for focusing by the cooperation of a rack 18a secured to said revolver holding base 18 and a pinion 19 rotated by the operation of a vertically moving handle provided on the microscope body but not illustrated. In the case of this embodiment, the micromanipulator 16 is fixed to the revolver holding base 18 through an attaching tool 20, the glass stylus 16a is attached to the body of the micromanipulator through a T-shaped arm 16b and the tip part is positioned within the focal depth of the focus position focused to the cell 11a within the caltivating vessel 11.

As the embodiment of the present invention is formed as in the above, for example, in the case of carrying out the above described pricking operation of thrusting the glass stylus 16a into the cell 11a to impregnate the cell with the enzyme in the caltivating liquid, when, first, the vertically moving handle not illustrated of the microscope body is operated to rotate the pinion 19 to vertically move the revolver holding base 18 to thereby focus the cell 11a to be pricked within the caltivating vessel 11, the vertically moving handle 16c of the micromanipulator 16 is operated to set the tip part of the glass stylus 16a of the micromanipulator 16 slightly above the cell 11a, that is, within the focal depth and then the vertically moving handle of the microscope body is operated to move the revolver holding base 18 slightly downward, by the downward movement of the revolver holding base 18, the glass stylus 16a of the micromanipulator 16 will also move downward in interlocking with it and will thrust the cell 11a to prick it. If the vertically moving handle of the microscope body is then returned to the original position, both of the revolver holding base 18 and micromanipulator 16 will return to the respective positions. If the stage 10 is then moved in the horizontal direction, the cell to be pricked next will be brought onto the optical axis of the microscope and the same operation will be made again to prick the cell. By the way, generally, the bottom surface of the caltivating vessel is not flat enough, the growth of the cells within the caltivating vessel does not uniformly expand along the bottom surface of the caltivating vessel and therefore the positions in the optical axis direction of the respective cells are different. However, according to the above mentioned embodiment, when the vertically moving handle of the microscope body is operated to vertically move the revolver bolding base 18 to focus the object, the micromanipulator 16 will move vertically in interlocking with the vertical movement of the revolver holding base 18 and the tip part of the glass stylus 16a will be always slightly above the focus position, that is, within the focal depth. Therefore, even if the position in the optical axis direction of the cell is different, by focusing the object with the vertically moving handle of the microscope, the object will be brought into focus area along with the tip part of the glass stylus 16a to as to be able to see in the visual field of an eyepiece or into the proper position. Also, by utilizing a ring slit 12a arranged in the front side focus position of the condenser lens 12 and a phase plate 15 arranged in the rear side focus position of the objective lens 13, a phase contrast microscopy can be made.

Figure 4:
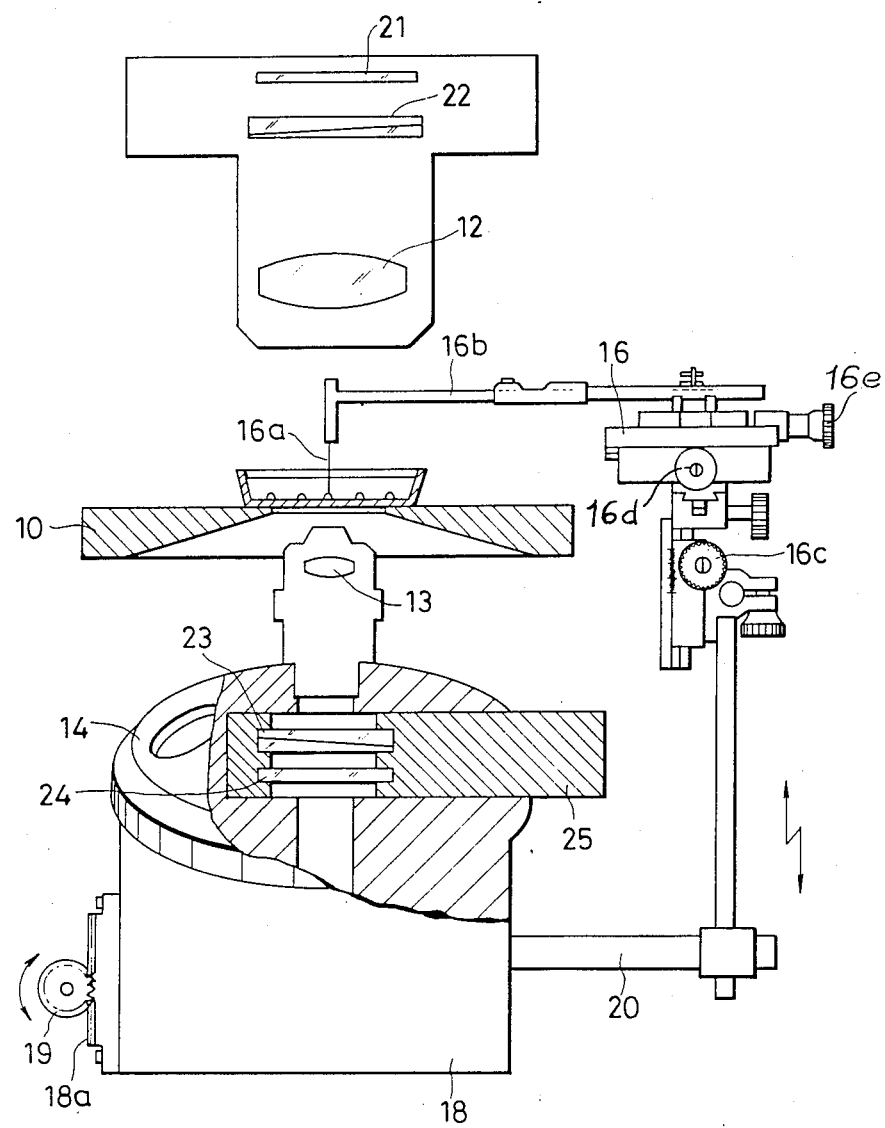
FIG. 4 is a view showing another embodiment of the present invention.

Further, FIG. 4 shows an embodiment in the case of performing a differential interference microscopy. The reference numerals 21 and 22 represent respectively a polarizer and Nomarski prism incorporated in the lens tube of the condenser lens 12. The reference numerals 23 and 24 represent respectively a Nomarski prism and analyzer incorporated integrally in an attackment arranged in the rear of the objective lens 13. The other formations are the same as in the embodiment in FIG. 3. According to this formation, the illuminating light will pass through the polarizer 21 and Nomarski prism 22, will then illuminate the cell 11a within the caltivating vessel 11 through the condenser lens 12, will pass through the Nomarski prism 23 and analyzer 24 within the attachment 25 through the objective lens 13 and will be led to the observing eyepiece system. Therefore, the minute structure of the cell 11a within the caltivating vessel 11 will be observed as an interference image having an interference constrast and a three-dimensional sense resembling the relief effect of shadowing, for example, in an electronic microscope. Thus, this formation is advantageous particularly in respect of the brightness, resolving power and contrast in the case of such manipulation as of injection into the front nucleus part of the cell.

By the way, in the above explanation, the case of the manipulation of pricking the cells within the cultivating vessel mounted on the stage has been described. It is needless to say that the present invention can be applied to an inverted-design microscope provided with a micromanipulator not only for the above described manipulation but also for various minute manipulations on the objects to be observed mounted on the stage. The micromanipulator is fixed directly to the revolver supporting base but may be attached to any other member and may be so formed as to be interlocked with the vertical movement in the optical axis direction for focusing of the revolver supporting base or the objective lens.

What is claimed is:

1. An inverted-design microscope comprising:
   a stage on which an object to be observed can be placed;
   an objective provided movable along the optical axis below said stage to enable an observer to observe said object placed on said stage from the lower side;
   a condenser lens unit for an illuminating system arranged to face said objective across said stage interposed between them;
   a glass stylus having a tip part and extending along the optical axis of said objective, said glass stylus being positioned above said object between said object and said condenser lens unit for an illuminating system to move along the optical axis to enable said tip part to prick said object vertically thereto, said glass stylus being held to face said objective by an arm means attached to an objective holding means provided as a revolver on which said objective is mounted;

a first driving means for vertically moving said objective holding means on which said objective is mounted, to focus and prick said object; and a second driving means for vertically moving said tip part to a position slightly above the focus position of said objective.

2. An inverted-design microscope according to claim 1, wherein:

said condenser lens unit includes therein an illumination side differential interference element and a condenser lens, said objective holding means includes therein an image forming side differential interference element, and said glass stylus is provided between said condenser lens and said object in an optical path in which said illumination side differential interference element, said condenser lens, said object, said objective and said image forming side differential interference element are arranged in turn, said glass stylus being so arranged as to move vertically in interlocking with vertical movement in the optical axis direction of said objective while focusing is performed.

3. An inverted-design microscope according to claim 1, wherein:

said arm means includes a micromanipulator having a vertically moving handle and capable of setting the tip part of said glass stylus slightly above said object, within the focal depth of the objective, by moving said vertically moving handle.

4. An inverted-design microscope according to claim 1, wherein:

said driving means is constituted by a manual operating handle.

* * * * *